US010544324B2

(12) United States Patent
Jung et al.

(10) Patent No.: US 10,544,324 B2
(45) Date of Patent: Jan. 28, 2020

(54) NONCOVALENT BOND-MODIFIED CARBON STRUCTURE, AND CARBON STRUCTURE/POLYMER COMPOSITE COMPRISING SAME

(71) Applicant: POSCO, Pohang-Si, Gyeongsangbuk-Do (KR)

(72) Inventors: Yong-Gyun Jung, Gwangyang-si (KR); Hye Jin Yoo, Busan (KR); Jung-Su Kim, Gwangyang-si (KR); Jong Sang Kim, Gwangyang-si (KR); Chang-Se Byeon, Gwangyang-si (KR)

(73) Assignee: POSCO, Pohang-si. Gyeongsangbuk-do (KR)

( * ) Notice: Subject to any disclaimer, the term of this patent is extended or adjusted under 35 U.S.C. 154(b) by 90 days.

(21) Appl. No.: 15/108,267

(22) PCT Filed: Dec. 24, 2014

(86) PCT No.: PCT/KR2014/012846
§ 371 (c)(1),
(2) Date: Jun. 24, 2016

(87) PCT Pub. No.: WO2015/099462
PCT Pub. Date: Jul. 2, 2015

(65) Prior Publication Data
US 2016/0326393 A1   Nov. 10, 2016

(30) Foreign Application Priority Data
Dec. 24, 2013  (KR) .................. 10-2013-0162705

(51) Int. Cl.
   C09D 17/00    (2006.01)
   C09D 7/40     (2018.01)
   C08J 3/20     (2006.01)
   C08K 9/04     (2006.01)
   C09D 5/24     (2006.01)
   C09K 5/14     (2006.01)
   H01B 1/24     (2006.01)
   B82Y 30/00    (2011.01)
   B82Y 40/00    (2011.01)
   C01B 32/174   (2017.01)

(52) U.S. Cl.
   CPC .......... *C09D 17/004* (2013.01); *C01B 32/174* (2017.08); *C08J 3/20* (2013.01); *C08K 9/04* (2013.01); *C09D 5/24* (2013.01); *C09D 7/70* (2018.01); *C09D 17/001* (2013.01); *C09K 5/14* (2013.01); *H01B 1/24* (2013.01); *B82Y 30/00* (2013.01); *B82Y 40/00* (2013.01); *C08J 2377/00* (2013.01); *C08K 2201/001* (2013.01); *C08K 2201/011* (2013.01); *Y10S 977/734* (2013.01); *Y10S 977/847* (2013.01); *Y10S 977/932* (2013.01)

(58) Field of Classification Search
   CPC .................................................. C01B 32/174
   See application file for complete search history.

(56) References Cited

U.S. PATENT DOCUMENTS

| 6,905,667 | B1 * | 6/2005 | Chen ...................... | B82Y 30/00 423/445 R |
| 8,343,450 | B2 * | 1/2013 | Wang .................... | C07C 233/62 423/447.1 |
| 2005/0100960 | A1 * | 5/2005 | Dai ........................ | B82Y 10/00 435/7.1 |
| 2007/0255002 | A1 * | 11/2007 | Alba ...................... | B82Y 30/00 524/543 |
| 2008/0287638 | A1 * | 11/2008 | Reynolds .............. | B29C 73/163 528/59 |
| 2009/0068244 | A1 * | 3/2009 | Weber ................... | A61L 27/443 424/423 |
| 2010/0137528 | A1 * | 6/2010 | Sample ................. | B82Y 30/00 525/455 |
| 2011/0129762 | A1 * | 6/2011 | Lee ........................ | B82Y 30/00 429/524 |

(Continued)

FOREIGN PATENT DOCUMENTS

| JP | 2013-544746 A | 12/2013 |
| KR | 10-2007-0016766 A | 2/2007 |

(Continued)

OTHER PUBLICATIONS

Chen et al. (Chem. Commun., 2013, 49, 2753-2755) (Year: 2013).*
Lim et al. (Applied Physics Letters 95, 2009, 243110) (Year: 2009).*
Zhang et al. (Nanoletters, 2003, vol. 3(3), 403-407) (Year: 2003).*
Yaping et al. (Material Science and Engineering A 435-436, 2006, 145-149) (Year: 2006).*
International Search Report issued in corresponding International Patent Application No. PCT/KR2014/012846, dated Feb. 6, 2015; with English translation.

(Continued)

*Primary Examiner* — Liam J Heincer
(74) *Attorney, Agent, or Firm* — Morgan, Lewis & Bockius LLP (57) ABSTRACT

According to the present invention, a noncovalent bond-modified carbon structure has advantages of: enabling the control of properties by controlling intervals between carbon structures according to the size and structure of a compound represented by Chemical Formula 1, which is inserted and adsorbed between the carbon structures; and enabling uniform dispersion in a polymer matrix without a change in intrinsic properties. In addition, a carbon structure/polymer composite comprising the modified carbon structure and a polymer matrix is simply manufactured and readily layered due to excellent orientation when forming a cured coating film, and thus can be useful for manufacturing a steel sheet having remarkable heat radiation, surface polarity, electrical properties and the like.

11 Claims, 1 Drawing Sheet

(56) References Cited

U.S. PATENT DOCUMENTS

| | | | | |
|---|---|---|---|---|
| 2012/0116094 A1* | 5/2012 | Swager | ............ | A24D 3/163 |
| | | | | 548/256 |
| 2013/0251998 A1* | 9/2013 | Hwang | ............ | C21D 3/04 |
| | | | | 428/408 |
| 2013/0288064 A1 | 10/2013 | Hladik | | |
| 2013/0295384 A1* | 11/2013 | Ma | ............ | B82Y 30/00 |
| | | | | 428/368 |
| 2013/0302605 A1* | 11/2013 | Yang | ............ | D01F 9/12 |
| | | | | 428/368 |
| 2014/0287912 A1* | 9/2014 | Souquet-Grumey | ... | B01J 21/18 |
| | | | | 502/150 |
| 2015/0238929 A1* | 8/2015 | Wei | ............ | B82Y 30/00 |
| | | | | 502/401 |
| 2015/0329741 A1* | 11/2015 | Yoo | ............ | C09D 167/02 |
| | | | | 428/219 |

FOREIGN PATENT DOCUMENTS

| | | |
|---|---|---|
| KR | 10-2010-0109258 A | 10/2010 |
| KR | 10-2011-0046978 A | 5/2011 |
| KR | 10-2013-0037329 A | 4/2013 |
| KR | 10-2013-0077780 A | 7/2013 |
| KR | 10-2013-0134446 A | 12/2013 |

OTHER PUBLICATIONS

Written Opinion of the International Searching Authority, issued in corresponding International Patent Application No. PCT/KR2014/012846, dated Feb. 6, 2015; with English translation.

Extended European Search Report dated Dec. 7, 2016 issued in European Patent Application No. 14873935.2.

Song, et al., "Enhanced Thermal Conductivity of Epoxy-Graphene Composites by Using Non-Oxidized Graphene Flakes with Non-Covalent Functionalization," Advanced Materials, 2013, vol. 25, pp. 732-737.

V. Georgakilas, et al., "Functionalization of Graphene: Covalent and Non-Covalent Approaches, Derivatives and Applications," Chemical Review, vol. 112, No. 11, Nov. 14, 2012, pp. 6156-6214.

* cited by examiner

NONCOVALENT BOND-MODIFIED CARBON STRUCTURE, AND CARBON STRUCTURE/POLYMER COMPOSITE COMPRISING SAME

TECHNICAL FIELD

The present invention relates to a noncovalent bond-modified carbon structure in which a carbon structure can be uniformly dispersed in a polymer matrix and has excellent orientation when a cured coating film is formed, and a carbon structure/polymer composite including the same.

BACKGROUND ART

According to the advancement of industry, demand for special functional composite materials which greatly exceed general physicochemical characteristics of existing polymer composite materials has increased, and interest in carbon structure/polymer composite materials using carbon structures having excellent mechanical-electromagnetic properties is rising.

Conventionally, research on carbon structure/polymer composite materials has progressed in directions related to improvement in mechanical properties of a polymer substrate, or to a field emission display (FED) using electromagnetic properties of a carbon structure. However, when a composite material is prepared, since a carbon structure is not uniformly dispersed but agglomerated in a polymer, there is a problem of intrinsic properties not being realized. For this reason, the commercialization thereof has been delayed and various studies have been conducted for improving dispersibility and compatibility of a carbon structure, results of which have been released in recent years.

For example, Korean Unexamined Patent Application Publication No. 10-2010-0109258 discloses an electroconductive particle in which a polymer particle is coated with graphene by forming an ionic bond between the polymer particle modified with an ionic functional group and the graphene having a surface modified with an ionic functional group. Also, Korean Unexamined Patent Application Publication No. 10-2013-0134446 discloses functionalized graphene including a functional group on a surface and a polymer-functionalized graphene composite including the same.

However, the above techniques require many processing steps, and also, when a carbon structure is treated with acid or a surface thereof is modified with a specific functional group (meaning a functional group is bonded on the surface), since deformation of an intrinsic carbon-carbon double bond that is delocalized in an carbon structure accompanies the addition of an extra reaction site, intrinsic properties of a carbon structure are deteriorated, and thus there is a limit in which properties realized in composites are slight.

Therefore, there is a pressing need for the development of a composite in which deformation of an intrinsic chemical structure of a carbon structure, that is, a carbon-carbon double bond that is delocalized is minimized, and thus excellent properties can be realized as well as preparation through a simple process is possible.

DISCLOSURE

Technical Problem

An object of the present invention is to provide a carbon structure in which few properties are deteriorated, and dispersibility and compatibility are improved by minimizing deformation of an intrinsic structure of a carbon structure.

Another object of the present invention is to provide a carbon structure/polymer composite including the carbon structure.

Still another object of the present invention is to provide a method for preparing the carbon structure/polymer composite.

Technical Solution

For achieving the objects,
the present invention provides a modified carbon structure which forms a noncovalent bond with a compound represented by the following Chemical Formula 1:

[Chemical Formula 1]

In Chemical Formula 1,
X is a $C_{6-20}$ aryl group;
Y is hydrogen or a $C_{1-4}$ alkyl group;
Z is one type selected from the group consisting of hydrogen, a hydroxyl group, an amine group, and a carboxyl group;
o, p, q, and r are each independently integers ranging from 0 to 10, in which when p is 0, q is 0; and
any one or more among hydrogen atoms of X, Y, and Z are unsubstituted or substituted with a $C_{1-4}$ alkyl group, a halogen group, a hydroxyl group, an amine group, or a carboxyl group.

Also, the present invention provides a carbon structure/polymer composite including a polymer matrix and the noncovalent bond-modified carbon structure, and having a structure in which the carbon structure is dispersed in the polymer matrix.

Furthermore, the present invention provides a method for preparing the carbon structure/polymer composite.

Advantageous Effects

According to the present invention, a noncovalent bond-modified carbon structure has advantages of enabling the control of properties by controlling intervals between carbon structures according to the size and structure of a compound represented by Chemical Formula 1, which is inserted and adsorbed between the carbon structures, and enabling uniform dispersion in a polymer matrix without a change in intrinsic physical properties. In addition, a carbon structure/polymer composite including the modified carbon structure and a polymer matrix is simply manufactured and readily layered due to excellent orientation when forming a cured coating film, and thus can be useful for manufacturing a steel sheet having remarkable heat radiation, surface polarity, electrical properties and the like.

MODES OF THE INVENTION

As the present invention allows for various changes and numerous embodiments, particular embodiments will be illustrated in the drawings and described in detail in the detailed description.

However, this is not intended to limit the present invention to specific embodiments, and it should be appreciated that all changes, equivalents, or substitutes within the spirit and technical scope of the present invention are included in the present invention.

In the present invention, it should be appreciated that the terms "include" or "have" are merely intended to indicate that features, numbers, steps, operations, components, parts, or combinations thereof are present, and not intended to exclude a possibility that one or more other features, numbers, steps, operations, components, parts, or combinations thereof will be present or added.

Also, drawings attached to the present specification should be understood to be magnified or reduced for the sake of convenience of the description.

The term "parts by weight" used herein refers to a weight ratio.

Also, the term "graphene" used herein is a combination of graphite and the suffix "-ene" which denotes a carbon double bond, and refers to a carbon structure having a monolayer structure arranged in a hexagonal honeycomb arrangement in a two-dimensional plane. That is, graphite has a structure in which carbon is stacked in a hexagonal honeycomb arrangement, but graphene has a monolayer structure in which a thin single sheet is thinly exfoliated from graphite.

Furthermore, the term "graphene nanoplatelet" used herein refers to short stacks of graphene, and is also referred to as an "expanded graphite nanoplate". Graphene is in the form of a sheet having a thickness of about 0.2 nm and having a monolayer structure, but the graphene nanoplatelet is in the form of a particle having a thickness of about 1 to 25 nm or a granule as such graphene is layered. In addition, the graphene nanoplatelet has relatively excellent dispersibility compared to other carbon structures because the graphene nanoplatelet has a wide surface area, and has an advantage in low cost compared to large-surface area graphene because the graphene nanoplatelet is prepared from low cost natural graphite.

The present invention provides a noncovalent bond-modified carbon structure, a carbon structure/polymer composite including the same, and a method for preparing the composite.

In the field of the carbon structure/polymer composite material, when a composite material is prepared, to solve a problem of intrinsic properties not being realized since a carbon structure is not uniformly dispersed but agglomerated in a polymer, various studies have been conducted, but techniques developed until now have problems of a complex preparation process or deformation in a structure of a carbon structure is involved. Thus, properties deteriorate. As a result, the commercialization thereof has been delayed.

To solve such problems, the present invention provides a modified carbon structure which forms a noncovalent bond with compounds including an aryl group and represented by Chemical Formula 1, and a carbon structure/polymer composite including the same. The carbon structure can be uniformly dispersed in a polymer matrix without a change in intrinsic properties of the carbon structure by forming a noncovalent bond with an aryl group of a compound represented by Chemical Formula 1. Also, a carbon structure/polymer composite including the carbon structure not only has excellent orientation and is well layered when a cured coating film is formed but also has a simplified preparation process. For this reason, the carbon structure/polymer composite can be easily used to realize properties such as a heat radiation property, a change in surface polarity, electrical properties and the like for a steel sheet.

Hereinafter, the present invention will be described in detail.

The present invention provides a modified carbon structure which forms a noncovalent bond with a compound represented by the following Chemical Formula 1:

[Chemical Formula 1]

In Chemical Formula 1,

X is a $C_{6-20}$ aryl group;

Y is hydrogen or a $C_{1-4}$ alkyl group;

Z is one type selected from the group consisting of hydrogen, a hydroxyl group, an amine group, and a carboxyl group;

o, p, q, and r are each independently integers ranging from 0 to 10, in which when p is 0, q is 0; and any one or more among hydrogen atoms of X, Y, and Z is unsubstituted or substituted with a $C_{1-4}$ alkyl group, a halogen group, a hydroxyl group, an amine group, or a carboxyl group.

Specifically, X is one type selected from the group consisting of a phenyl group, a biphenyl group, a naphthyl group, an anthracenyl group, and a pyrenyl group, where, the phenyl group, the biphenyl group, the naphthyl group, the anthracenyl group, and the pyrenyl group may be unsubstituted or substituted with a methyl group, a ethyl group, a chloro group, a bromo group, a hydroxyl group, an amine group, or a carboxyl group; and o, p, q, and r are each independently integers ranging from 0 to 5, in which when p is 0, q is 0.

More specifically, a compound represented by Chemical Formula 1 according to the present invention may be any one of compounds represented by <Structure 1-1> to <Structure 1-10> of the following Table 1:

<Structure 1-1>

<Structure 1-2>

<Structure 1-3>

<Structure 1-4>

<Structure 1-5>

<Structure 1-6>

<Structure 1-7>

<Structure 1-8>

<Structure 1-9>

<Structure 1-10>

Also, a compound represented by Chemical Formula 1 according to the present invention may be any one of compounds represented by <Structure 2-1> to <Structure 2-10> of the following Table 2:

<Structure 2-1>

<Structure 2-2>

<Structure 2-3>

<Structure 2-4>

<Structure 2-5>

<Structure 2-6>

<Structure 2-7>

<Structure 2-8>

<Structure 2-9>

<Structure 2-10>

A compound represented by Chemical Formula 1 according to the present invention may have a structure in which a $C_1$ to $C_{20}$ alkyl chain is connected to a $C_{6-20}$ aryl group (X). In this case, hydrophilic mono- to bi-functional groups such as a hydroxyl group, an amine group, a carboxyl group and the like may be bonded to the end of the alkyl chain. Also, a double bond may be further included in the alkyl chain by introducing acrylic acid (AA), methyl acrylate (MA), methyl methacrylate (MMA), 2-hydroxyethyl methacrylate (2-HEMA) and the like as a linker.

A compound represented by Chemical Formula 1 may enable a carbon structure to be dispersed more homogeneously in a polymer through a $C_{6-20}$ aryl group. Also, since an alkyl chain included in the compound is hydrophobic, dispersibility of a carbon structure with respect to an organic solvent may be improved. Furthermore, hydrophilic functional groups bonded to the end of the alkyl chain play a role in improving dispersibility of a carbon structure with respect to an aqueous solvent, and thus a double bond introduced into the alkyl chain may be used as a functional group of a chemical bond.

The term 'modify' used herein means that a compound represented by Chemical Formula 1 is intercalated between carbon structures and is then adsorbed on the surface of carbon structures, and the carbon structures may have effects of adjusting intervals between the carbon structures and improving the dispersion force of carbon structures when modified.

Generally, a carbon structure has advantages of having excellent physical and chemical stability, electrical conductivity, elasticity, strength, and thermal conductivity. However, despite such advantages, when dispersed, carbon structures are agglomerated by the Van der Waals force between carbon particles. As a result, intrinsic properties of carbon structures may not be used effectively.

However, a modified carbon structure according to the present invention performs noncovalent adsorption in the form of a pi bond with an aryl group of a compound represented in Chemical Formula 1 and a hexagonal honeycomb structure composed of $sp^2$ carbon of the surface of a carbon structure. That is, in a modified carbon structure according to the present invention, through noncovalent adsorption with an aryl group, polarizability of carbon structures and the Van der Waals force between particles of carbon structures may be weakened, and thus the cohesive force between particles of the carbon structures may be weakened, and as a result, the dispersion force may be improved.

Figure 3:
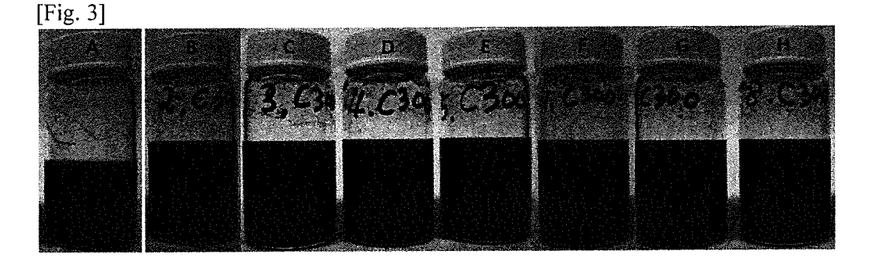
FIG. 3 is an image in which a mixture state is captured right after a granule/powder type graphene nanoplatelet (Grade C) suspension is mixed with compound solutions of Chemical Formula 1 prepared in Preparative Examples 1 to 4 and 6 to 8 in an exemplary embodiment: Here, A is a graphene nanoplatelet suspension, and B to H are mixtures in which the solutions prepared in Preparative Example 1 to 4 and 6 to 8 are sequentially added to the graphene nanoplatelet suspension.

Specifically referring to FIG. 3, when in an exemplary embodiment, the dispersion force of a modified carbon structure according to the present invention is evaluated, and as a result, it can be seen that particles of carbon structures are not agglomerated but uniformly dispersed.

Also, a carbon structure according to the present invention is modified by a compound represented by Chemical Formula 1 so that the dispersion force may be improved. At the same time, when the carbon structure is a graphene nanoplatelet having a structure in which graphene is layered, intervals between the graphene may be adjusted according to a size and structure of a compound represented by Chemical Formula 1 which is adsorbed on the surface of the carbon structure, and thus properties of the carbon structure may also be adjusted.

In this case, for example, carbon nanotubes (CNT), graphene, graphene nanoplatelets, or a mixture thereof may be used as the carbon structure according to the present invention. More specifically, non-oxidized graphene nanoplatelets may be used as the carbon structure.

Oxidized graphene nanoplatelets have excellent dispersibility with respect to a hydrophilic solvent, but remarkably low electrical conductivity ($3.7 \times 10^{-7}$ S/cm). As a result, in the case of requiring electromagnetic properties, it is necessary to perform a process for reduction of the carbon structure. However, when non-oxidized graphene nanoplatelets are used as a carbon structure, a process for reduction of a carbon structure is excluded, and thus there are advantages of remarkably reducing a defect rate of a carbon structure as well as simplifying a process for preparing a carbon structure having a structure in which the carbon structure is dispersed in a polymer matrix.

Here, since the graphene nanoplatelets are not oxidized, an oxygen (O) element content may be low. Specifically, the oxygen (O) element content of graphene nanoplatelets may be 10.0% by weight or less (an carbon (C) element content: 90.0% by weight or more), and more specifically, 9.00% by weight or less, 8.00% by weight or less, 7.00% by weight or less, 6.00% by weight or less, or 5.00% by weight or less with respect to a total weight of graphene nanoplatelets.

Also, the modified carbon structure according to the present invention may have a structure in which a carbon structure is dispersed in a polymer matrix.

In this case, the polymer matrix may be used without particular limitation as long as the polymer matrix does not affect a noncovalent bond between a surface of a modified carbon structure and a compound represented by Chemical Formula 1. Specifically, the polymer matrix may include one or more types of polymers selected from the group consisting of polyurethane, polyacrylate, a copolymer of urethane and an acryl, polyolefin, polystyrene, an epoxy resin, polyester, polypropylene, polyvinyl, polyamide, and a silane based resin.

Further, the carbon structure according to the present invention may be included in an amount of 0.1 to 20 parts by weight with respect to 100 parts by weight of a polymer matrix.

When the carbon structure according to the present invention is uniformly dispersed in a polymer matrix within the above range, not only mechanical strength but also electrical conductivity of a polymer matrix is effectively improved, and thus composites having excellent mechanical-electromagnetic properties may be prepared.

Also, the present invention provides a method for preparing a carbon structure/polymer composite including:

a step of preparing a mixture in which a suspension in which a carbon structure is dispersed is mixed with a solution in which a compound represented by the following Chemical Formula 1 is dissolved;

a step of obtaining a modified carbon structure from the mixture; and a step of dispersing the modified carbon structure in a polymer matrix, wherein a concentration of the solution in which the compound represented by Chemical Formula 1 is dissolved is 0.1 to 5 M:

[Chemical Formula 1]

In Chemical Formula 1,

X is a $C_{6-20}$ aryl group;

Y is hydrogen or a $C_{1-4}$ alkyl group;

Z is one type selected from the group consisting of hydrogen, a hydroxyl group, an amine group, and a carboxyl group;

o, p, q, and r are each independently integers ranging from 0 to 10, in which when p is 0, q is 0; and any one or more among hydrogen atoms of X, Y, and Z is unsubstituted or substituted with a $C_{1-4}$ alkyl group, a halogen group, a hydroxyl group, an amine group, or a carboxyl group.

Hereinafter, a method for preparing the carbon structure/polymer composite will be described in more detail step by step.

First, in the step of preparing the mixture, the mixture in which a suspension in which a carbon structure is dispersed is mixed with a solution in which a compound represented by Chemical Formula 1 is dissolved is subjected to ultrasonic wave irradiation or stirring.

Here, the suspension in which the carbon structure is dispersed is mixed with the solution in which the compound represented by Chemical Formula 1 is dissolved in the above-described step so that a compound of Chemical Formula 1 is intercalated between carbon structures and is adsorbed on a surface at the same time.

In this case, a solvent used in a carbon structure suspension is not particularly limited as long as the carbon structure is easily dispersed. Specifically, water, a $C_{1-4}$ alkyl alcohol, a mixture thereof and the like may be used. More specifically, methanol, ethanol, a mixed solvent of water and methanol (1:1 to 5, v/v) and the like may be used.

Also, a concentration of the solution in which the compound represented by Chemical Formula 1 is dissolved may be 0.1 to 5 M, and more specifically 0.1 to 4 M; 0.1 to 3 M; 0.1 to 2 M; or 0.1 to 1 M. The solution in which the compound represented by Chemical Formula 1 according to the present invention is dissolved may increase efficiency of dispersing the carbon structure, within the above range, and may prevent the compound represented by Chemical Formula 1 from being precipitated due to supersaturation and overconsumption of a solvent.

Further, the temperature of a prepared mixture is not particularly limited, but when prepared through ultrasonic wave irradiation, since a solvent of a suspension and a solution may be volatilized by increasing the temperature of the mixture, the mixture may be controlled at 60° C. or less.

Next, in the step of obtaining a modified carbon structure, the compound represented by Chemical Formula 1 is intercalated and adsorbed to obtain the modified carbon structure, the step may be performed through a step of obtaining a solid content of the modified carbon structure by concentrating a mixture;

a step of pulverizing the solid content; and a step of adding the solid content or a polymer matrix into a solvent.

In this case, the step of obtaining a solid content may be performed through distillation under reduced pressure, centrifugation and the like. Besides, any method which is conventionally used by one skilled in the art to concentrate a suspension may be used without particular limitation.

Also, the step of pulverizing may be performed in order to reduce a particle size of an obtained solid content, and thus, dispersion of a pulverized carbon structure solid content may be remarkably improved with respect to a polymer matrix compared to that of a non-pulverized carbon structure solid content.

Further, in the step of adding the solid content or the polymer matrix into the solvent, any one or more of the carbon structure and the polymer matrix is dispersed or dissolved in the solvent, may be performed in order to improve the operability of a subsequent process of dispersing the carbon structure in the polymer matrix.

Next, the step of dispersing the modified carbon structure in the polymer matrix may be performed by ultrasonically irradiating or stirring a mixture of the modified carbon structure and a polymer matrix.

In this case, the polymer matrix is not particularly limited as long as the polymer matrix does not affect a noncovalent bond of the carbon structure with the compound represented by Chemical Formula 1. Specifically, the polymer matrix may include one or more types of polymers selected from the group consisting of polyurethane, polyacrylate, a copolymer of urethane and an acryl, polyolefin, polystyrene, an epoxy resin, polyester, polypropylene, polyvinyl, polyamide, and a silane based resin.

Also, the temperature of the mixture is not particularly limited, but when prepared through ultrasonic wave irradiation, since a solvent of a suspension and a solution may be volatilized by increasing the temperature of the mixture, the mixture may be controlled at 60° C. or less.

Meanwhile, in the present invention provides a steel sheet comprising:

a steel sheet; and a cured coating film formed on one side or both sides of the steel sheet, including a carbon structure/polymer composite.

A material of the steel sheet according to the present invention is not particularly limited, but specifically may be one or more selected from the group consisting of a cold rolled steel sheet; a galvanized steel sheet; a zinc-electroplated steel sheet; a hot dip galvanized steel sheet; an aluminum coated steel sheet; a plated steel sheet including cobalt, molybdenum, tungsten, nickel, titanium, aluminum, manganese, iron, magnesium, tin, copper, or a mixture thereof in a plated layer; an aluminum alloy plate in which silicon, copper, magnesium, iron, manganese, titanium, zinc, or a mixture thereof was added; a galvanized steel sheet applied with phosphate; and a hot rolled steel sheet.

Also, a thickness of the steel sheet may be properly selected according to applicable purposes and uses of the used steel sheet. Specifically, steel sheets are divided into thick plates exceeding 6 mm, medium plates which are in a range of 1 to 6 mm, and thin plates which are less than 1 mm according to their thicknesses. Such steel sheets are properly adopted in the present invention according to applicable purposes.

Further, a cured coating film formed on the steel sheet may include a carbon structure/polymer composite of the present invention. Since a carbon structure/polymer composite according to the present invention has two-dimensionally excellent orientation, and the cured coating film may be well layered on a surface of the steel sheet, in the surface of a steel sheet including the same, a heat dissipation property, surface polarity, electrical properties and the like may be readily realized. Here, thicknesses of cured coating films formed on one side or both sides of the steel sheet may be applied in various ways according to applicable purposes of the steel sheet.

In addition, the cured coating film may be formed by dip coating, spin coating, printing, meniscus coating, or spray coating, and additionally, may be prepared by a method for coating a surface conventionally used by one skilled in the art.

Hereinafter, the present invention will be described in more detail according to embodiment examples and an experimental example.

However, the following embodiment examples and experimental example are merely presented to exemplify the present invention, and the content of the present invention is not limited to the following embodiment examples and experimental example.

PREPARATIVE EXAMPLES 1 TO 8

Preparation of a Solution in which a Compound Represented by Chemical Formula 1 is Dissolved As shown in the following Table 1, a compound represented by Chemical Formula 1 was dissolved in methanol (20 mL) and a solution in which the compound of Chemical Formula 1 was dissolved was prepared. In this case, in the case of preparative Example 5, it was seen that the compound was precipitated due to supersaturation.

TABLE 1

| | compound structure | added amount (g) | concentration of solution (M) |
|---|---|---|---|
| Preparative Example 1 | pyrene-COOH | 0.00492 | 0.01 |
| Preparative Example 2 | | 0.00984 | 0.02 |
| Preparative Example 3 | | 0.01476 | 0.03 |
| Preparative Example 4 | | 0.02460 | 0.05 |
| Preparative Example 5 | | 0.0492 | 0.10 |
| Preparative Example 6 | pyrene-(CH$_2$)$_3$-COOH | 0.01152 | 0.02 |
| Preparative Example 7 | pyrene-CH$_2$OH | 0.00928 | 0.02 |
| Preparative Example 8 | pyrene-NH$_2$ | 0.00868 | 0.02 |

PREPARATIVE EXAMPLES 9 TO 10

Preparation of a Carbon Structure Suspension

Graphene nanoplatelets used as a carbon structure were purchased from XG Sciences Co. in two forms including a granule type (Grade H, oxygen content: about 1% by weight or less, a specific surface area: 50 to 80 m$^2$/g, and an average thickness: about 15 nm) and a granule/powder type (Grade C, oxygen content: about 8% by weight or less, a specific surface area: about 750 m²/g, and an average thickness: about 5 nm or less). Each of the graphene nanoplatelets was added in a mixed solvent of methanol/water (1/3, v/v) (10 mL) in an amount of 0.05 g, and then ultrasonic waves were irradiated for an hour and a half to prepare a carbon structure suspension.

EMBODIMENT EXAMPLE 1

Preparation 1 of a Noncovalent Bond-modified Carbon Structure

A noncovalent bond-modified carbon structure was prepared by mixing a solution prepared in Preparative Example 1 and a suspension (Grade H suspension) prepared in Preparative Example 9, and irradiating ultrasonic waves at 50° C. for 6 hours.

EMBODIMENT EXAMPLES 2 TO 14

Preparation 2 to 14 of a Noncovalent Bond-modified Carbon Structure

As shown in the following Table 2, noncovalent bond-modified carbon structures were prepared by mixing solutions prepared in Preparative Examples 1 to 8 and suspensions prepared in Preparative Examples 9 and 10, and performing the same method as in Embodiment 1.

TABLE 2

|  | solution in which compound of Chemical Formula 1 is dissolved | Carbonic acid structure suspension |
| --- | --- | --- |
| Embodiment Example 2 | Preparative Example 2 | Preparative Example 9 (Grade H suspension) |
| Embodiment Example 3 | Preparative Example 3 | Preparative Example 9 (Grade H suspension) |
| Embodiment Example 4 | Preparative Example 4 | Preparative Example 9 (Grade H suspension) |
| Embodiment Example 5 | Preparative Example 6 | Preparative Example 9 (Grade H suspension) |
| Embodiment Example 6 | Preparative Example 7 | Preparative Example 9 (Grade H suspension) |
| Embodiment Example 7 | Preparative Example 8 | Preparative Example 9 (Grade H suspension) |
| Embodiment Example 8 | Preparative Example 1 | Preparative Example 10 (Grade C suspension) |
| Embodiment Example 9 | Preparative Example 2 | Preparative Example 10 (Grade C suspension) |
| Embodiment Example 10 | Preparative Example 3 | Preparative Example 10 (Grade C suspension) |
| Embodiment Example 11 | Preparative Example 4 | Preparative Example 10 (Grade C suspension) |
| Embodiment Example 12 | Preparative Example 6 | Preparative Example 10 (Grade C suspension) |
| Embodiment Example 13 | Preparative Example 7 | Preparative Example 10 (Grade C suspension) |
| Embodiment Example 14 | Preparative Example 8 | Preparative Example 10 (Grade C suspension) |

EMBODIMENT EXAMPLE 15

Preparation of a Carbon Structure Having a Structure Dispersed in a Polymer Matrix The modified graphene nanoplatelets prepared in Embodiment example 1 were dried under reduced pressure and then concentrated. A solid content obtained with the concentration was pulverized using a mortar, and polyamide (0.5 g, Mw=65,000) was dissolved in chloroform. A pulverized solid content was added in an amount of 5 parts by weight with respect to polyamide, and was ultrasonically treated at room temperature for 30 minutes to prepare a carbon structure solution having a structure in which a modified carbon structure was dispersed in a polymer matrix.

EMBODIMENT EXAMPLE 16

Surface Treatment of Slabs Using a Carbon Structure

A steel sheet was coated with a carbon structure solution prepared in Embodiment example 15 using a roll coater, and then cured to form a cured coating film having a thickness of 10 μm on one side of a steel sheet.

EXPERIMENTAL EXAMPLE 1

Evaluation of Dispersion Force of a Modified Carbon Structure

To evaluate the dispersion force of a modified carbon structure according to the present invention, the following experiment was performed.

In the process of modifying a carbon structure of Embodiment examples 1 to 14, the mixture state was observed with the naked eye right after mixing a carbon structure suspension and the solution in which the compound represented by Chemical Formula 1 was dissolved. Also, after ultrasonic wave was irradiated at 50° C. for 6 hours; 2 to 3 days pass; and 6 months pass, the mixture state was observed with the naked eye, results of which were shown in the following FIGS. 1 to 3.

Figure 1:
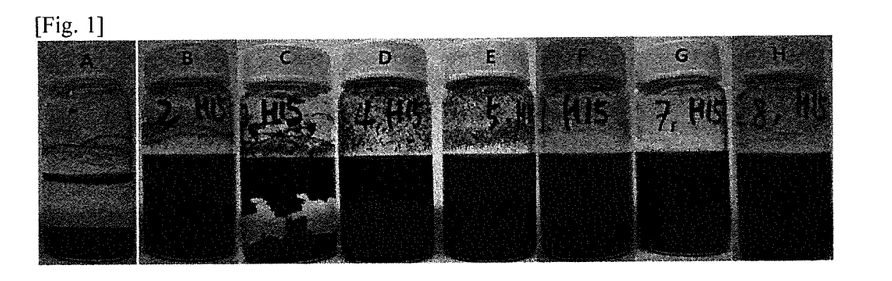
FIG. 1 is an image in which a mixture state is captured right after a granule type graphene nanoplatelet (Grade H) suspension is mixed with compound solutions of Chemical Formula 1 prepared in Preparative Examples 1 to 4 and 6 to 8 in an exemplary embodiment: Here, A is a graphene nanoplatelet suspension, and B to H are mixtures in which the solutions prepared in Preparative Examples 1 to 4 and 6 to 8 are sequentially added to the graphene nanoplatelet suspension.
Figure 2:
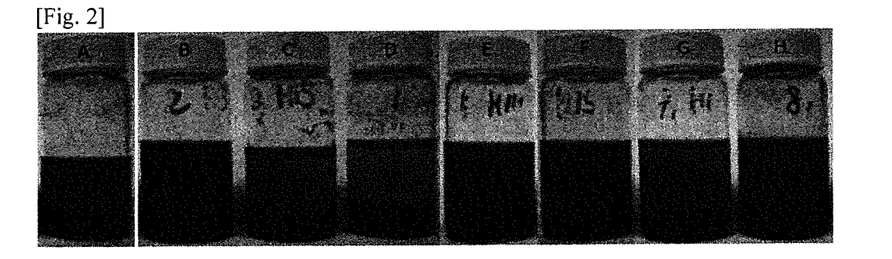
FIG. 2 is an image in which a mixture state is captured after a granule type graphene nanoplatelet (Grade H) suspension is mixed with compound solutions of Chemical Formula 1 prepared in Preparative Examples 1 to 4 and 6 to 8 and then ultrasonic waves are irradiated in an exemplary embodiment: Here, A is a graphene nanoplatelet suspension, and B to H are mixtures in which the solutions prepared in Preparative Example 1 to 4 and 6 to 8 are sequentially added to the graphene nanoplatelet suspension.

As shown in FIGS. 1 to 3, it can be seen that the dispersion force of a noncovalent bond-modified carbon structure according to the present invention was improved.

More specifically, referring to FIG. 1, in mixtures of Embodiment examples 1 to 7, carbon structures were agglomerated right after mixing a suspension and a compound solution of Chemical Formula 1 in some cases, but over time, a carbon structure began to be suspended and dispersed at the same time, so that a solution was cloudy. Whereas, in a suspension to which the compound solution of Chemical Formula 1 is not added, all graphene nanoplatelets were precipitated, so that supernatant was clear.

In addition, referring FIG. 2, mixtures of Embodiment examples 1 to 7 were ultrasonically radiated at 50° C. for 6 hours. As a result, it was seen that, in mixtures of Embodiment examples 1, 4, 5, 6, and 7, the dispersion of graphene nanoplatelets was improved compared to a suspension to which the compound of Chemical Formula 1 was not added. Furthermore, it was seen that the 5 types of mixtures were maintained in a state of being homogeneously dispersed even after 2 to 3 days. Whereas, it was seen that all graphene nanoplatelets were precipitated after 24 hours when the compound of Chemical Formula 1 is not added.

Further, referring to FIG. 3, in mixtures of Embodiment examples 8 to 14, it was seen that graphene nanoplatelets were uniformly dispersed in a solution right after mixing a suspension and the compound solution of Chemical Formula 1. Also, the graphene nanoplatelets of Embodiment examples 8 to 14, although they may differ slightly depending on a mixed concentration of the compound represented by Chemical Formula 1, were maintained in a state of being uniformly dispersed in a solution even after 6 months.

Through such results, it can be seen that the dispersion force of a noncovalent bond-modified carbon structure according to the present invention is improved.

Therefore, a noncovalent bond-modified carbon structure has advantages of enabling the control of properties by controlling intervals between carbon structures according to the size and structure of a compound represented by Chemical Formula 1, which is inserted and adsorbed between the carbon structures, and enabling uniform dispersion in a polymer matrix without a change in intrinsic properties.

INDUSTRIAL APPLICABILITY

According to the present invention, a noncovalent bond-modified carbon structure has advantages of enabling the control of properties by controlling intervals between carbon structures according to the size and structure of a compound represented by Chemical formula 1, which is inserted and adsorbed between the carbon structures, and enabling uniform dispersion in a polymer matrix without a change in intrinsic properties. In addition, a carbon structure/polymer composite comprising the modified carbon structure and a polymer matrix is simply manufactured and readily layered due to excellent orientation when forming a cured coating film, and thus can be useful for manufacturing a steel sheet having remarkable heat radiation, surface polarity, electrical properties and the like.

The invention claimed is:

1. A carbon structure non-covalently bonded to a compound represented by the following <Structure 2-6> to <Structure 2-10>:

2. The carbon structure according to claim 1,
wherein the carbon structure is one or more types selected from a group consisting of carbon nanotubes (CNT), graphene, and graphene nanoplatelets.

3. A carbon structure/polymer composite comprising;
a polymer matrix; and
a carbon structure non-covalently bonded to a compound represented by the following <Structure 2-6> to <Structure 2-10>,
wherein the carbon structure has a structure in which the carbon structure is dispersed in the polymer matrix, and
a content of the carbon structure is 0.1 to 20 parts by weight with respect to 100 parts by weight of the polymer matrix, and <Structure 2-6> to <Structure 2-10> are as follows:

4. A method for preparing a carbon structure/polymer composite, comprising:

a step of preparing a mixture in which a suspension in which a carbon structure is dispersed is mixed with a solution in which a compound represented by the following <Structure 2-6> to <Structure 2-10> is dissolved;
a step of obtaining a modified carbon structure from the mixture; and
a step of dispersing the modified carbon structure in a polymer matrix,
wherein a concentration of a solution in which the compound represented by <Structure 2-6> to <Structure 2-10> is dissolved is 0.1 to 5 M:

5. The method for preparing the carbon structure/polymer composite according to claim 4,
wherein the carbon structure of a carbon structure suspension is dispersed in one or more solvents selected from the group consisting of water and a $C_{1-4}$ alkyl alcohol.

6. The method for preparing the carbon structure/polymer composite according to claim 4,
wherein the step of obtaining the modified carbon structure comprises:
a step of obtaining a solid content of the modified carbon structure by concentrating a mixture;
a step of pulverizing the solid content; and
a step of adding the solid content or a polymer matrix into a solvent.

7. The method for preparing the carbon structure/polymer composite according to claim 4,
wherein any one or more steps of the step of preparing the mixture and the step of dispersing the modified carbon structure in the polymer matrix are performed by ultrasonically irradiating or stirring.

8. The method for preparing the carbon structure/polymer composite according to claim 7,
wherein ultrasonic wave irradiation is performed at 60° C. or less.

9. A steel comprising a cured coating film formed on one side or both sides of the steel sheet,
wherein the cured coating film has a carbon structure/polymer composite comprising a polymer matrix and a carbon structure non-covalently bonded to a compound represented by the following <Structure 2-6> to <Structure 2-10>, wherein the carbon structure/polymer composite has a structure in which the carbon structure is dispersed in the polymer matrix, and <Structure 2-6> to <Structure 2-10> are as follows:

10. The steel sheet according to claim 9,
wherein the carbon structure is one or more types selected from a group consisting of carbon nanotubes (CNT), graphene, and graphene nanoplatelets.

11. The steel sheet according to claim 9,
wherein a content of the carbon structure is 0.1 to 20 parts by weight with respect to 100 parts by weight of the polymer matrix.

* * * * *